July 6, 1943.  J. HANSEN  2,323,769
MEAT TENDERING MACHINE
Filed June 5, 1939  4 Sheets-Sheet 1

INVENTOR.
John Hansen,
BY John A. Marzall
ATTORNEY.

INVENTOR.
John Hansen,
BY John A. Marzall
ATTORNEY.

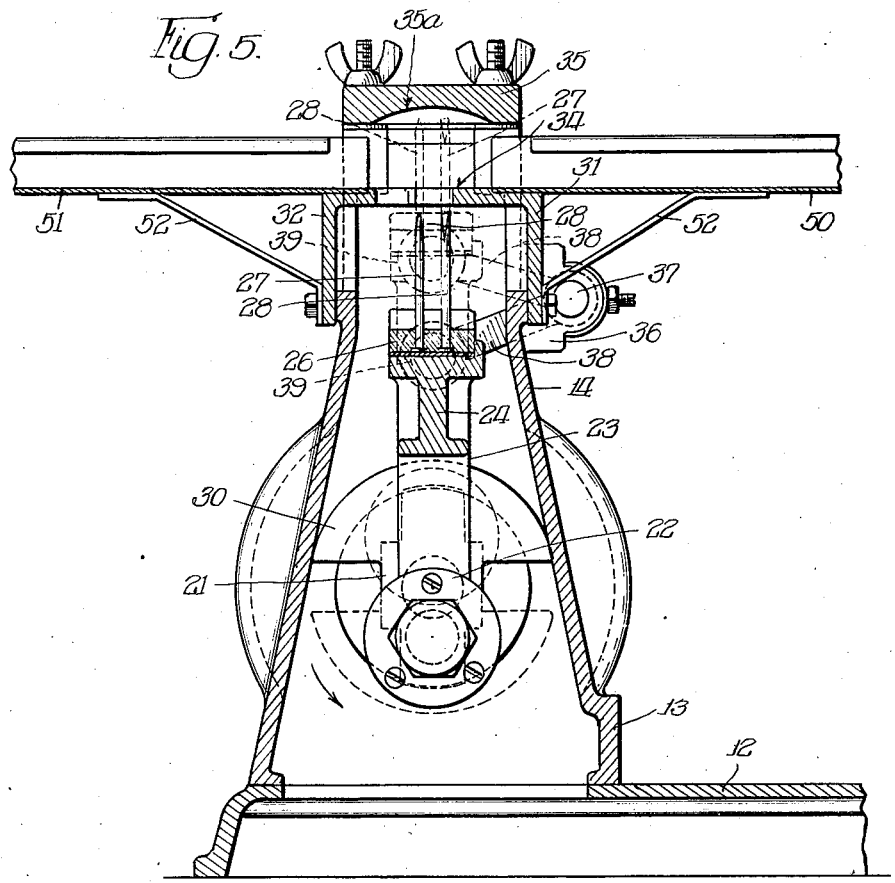
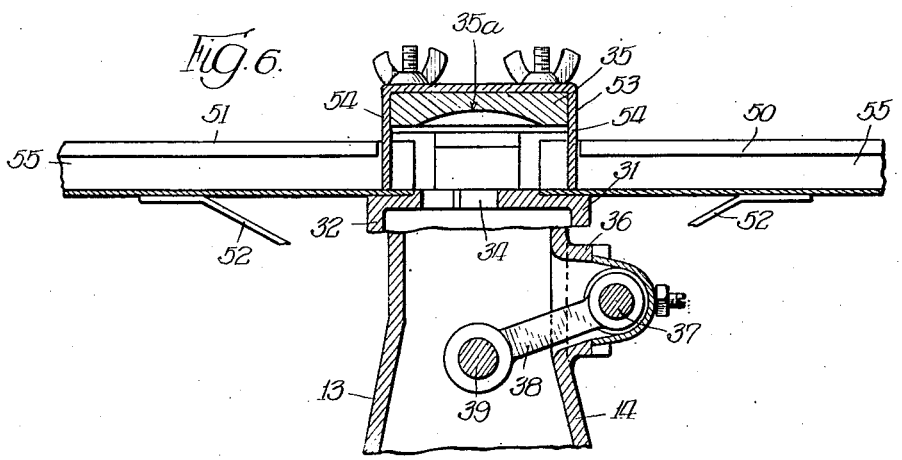

July 6, 1943. J. HANSEN 2,323,769
MEAT TENDERING MACHINE
Filed June 5, 1939 4 Sheets-Sheet 4
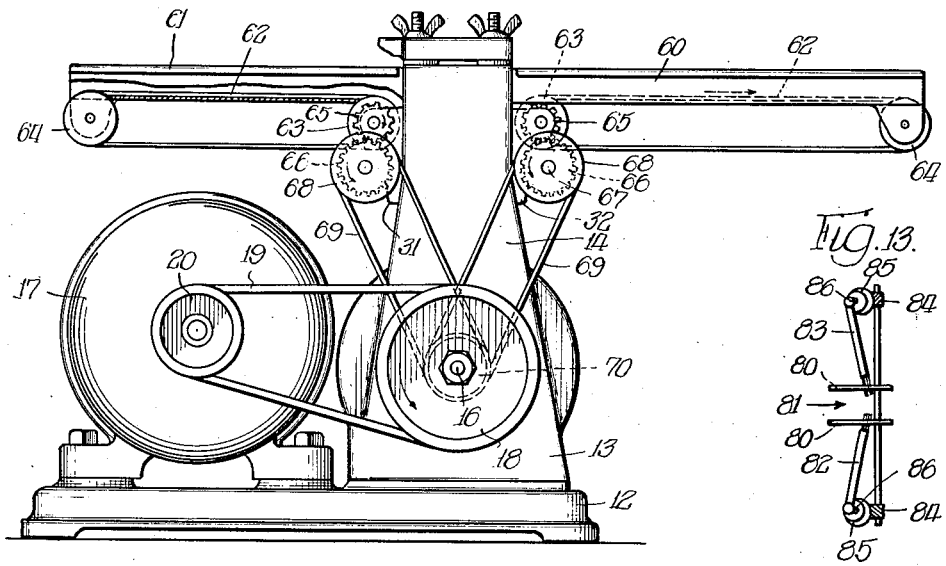
INVENTOR.
John Hansen,
BY John A. Marzall
ATTORNEY.

Patented July 6, 1943

2,323,769

UNITED STATES PATENT OFFICE 2,323,769

MEAT TENDERING MACHINE

John Hansen, Bettendorf, Iowa, assignor to U. S. Slicing Machine Company, La Porte, Ind., a corporation of Indiana Application June 5, 1939, Serial No. 277,471

24 Claims. (Cl. 17—25)

My invention relates to machines for tenderizing pieces of meat and particularly the tougher portions thereof.

This application is a continuation-in-part of application Serial No. 119,566, filed January 8, 1937.

An important object of the present invention is the provision of a new and novel machine capable of tenderizing the tougher portions of meat by breaking up or cutting the more fibrous parts thereof, and making them edible and palatable; the machine being efficient in character and operation, of simple and durable construction, and capable of being produced at a relatively low cost.

Another important object of the present invention is the provision of new and improved means for breaking up the sinews and tougher portions of a piece of meat by means of a plurality of fast-operating chisel-formed tools, which move into and out of a piece of meat during the movement of the meat through the machine, until the same is thoroughly tenderized.

Another object of the invention is to operate tenderizing tools in such a manner that they will enter a piece of meat at one point of the machine, and be withdrawn therefrom at another point, the action of the tools between the two points being effective to cause a feed movement of the piece of meat, so that the next entry of the tools into the meat will be at a different point than in the former insertion and thereby provide a practically constant movement of the meat during the operation and movement of the tools and without the use of any additional feed means.

A further object of the invention is the provision of new, simple and improved means which makes it possible to use tools of different types, with mountings therefor held detachably in place, so that one of such mountings and its battery of tools can be interchanged for another one, whereby tools of a relatively blunt character can be used on a piece of meat for macerating the same, and afterwards using a set of sharper tools if desired.

Still another object of the present invention is the provision of a machine capable of permitting two or more pieces of meat to be run through at the same time, and knitting the pieces together in the form of a single piece of meat.

Another object of the invention is the method of tenderizing meat which consists in feeding the meat to tenderizing tools, passing the tenderizing tools through the meat to tenderize the same, the feeding movement of the meat being accomplished by the tenderizing tools.

In the form of the device set forth herein for the purpose of describing the invention there is shown a machine having a single set or battery of tools, the working ends of which are upwardly directed. These tools are carried upwardly in their movement to a point near the lower face of an upper cross-piece, against which the meat is forced by the action of the tools. The cross-piece is preferably formed with receiving apertures, or it may be made of wood or other relatively soft material so as not to cause injury to the ends of the tools. The distance between the upper cross-piece or cross-head and the lower stripper plate of the machine can be varied as desired, the face of the lower stripper being provided preferably with slots or apertures through which the free ends of the tools pass. The machine is capable of being arranged so that the tools will operate entirely through the meat, or only part way, as desired.

The machine may be provided in a compound form, in which one set of tools is opposed to another set, with the two sets operating in unison, so as to act jointly in the tendering of a piece of meat, and in the feed movement thereof. The parts of the machine in and by which the tenderizing of a piece of meat is accomplished are arranged for convenient removal, so as to be easily cleaned, thus aiding in keeping the machine in a sanitary condition.

The above named and other features and advantages of the invention will more fully appear from the following specification, reference being had to the accompanying drawings, in which:

Fig. 5 is a detail vertical sectional view on the line 5—5 of Fig. 3;

Fig. 6 is a detail sectional view on the line 6—6 of Fig. 3;

Fig. 7 is a side elevation of the machine showing feeding and discharging conveyors;

Figs. 8 and 9 are section views showing modified forms of the cap-plates which may be used;

Figs. 10 to 12 are detail elevational views of different kinds of tools which may be used; and Fig. 13 is a diagrammatic or schematic view of a modified form of device capable of projecting tools above and below the piece of meat to be acted upon.

Similar reference characters indicate corresponding parts throughout the several figures.

Figure 2:
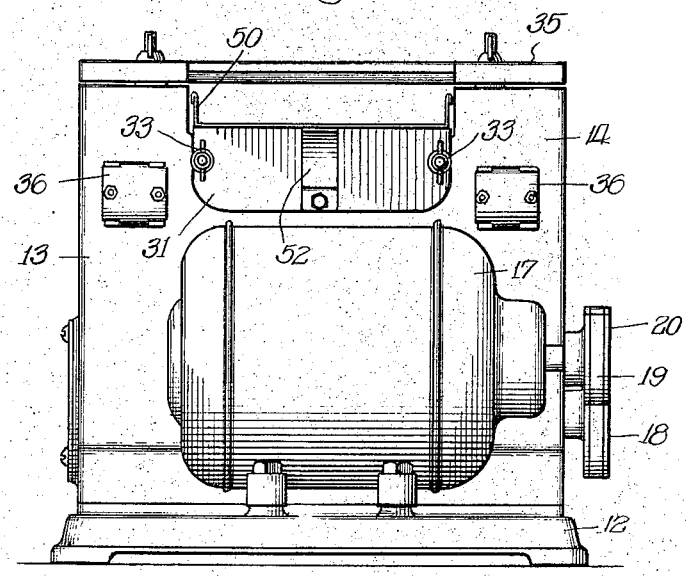
Fig. 2 is an elevation thereof.
Figure 3:
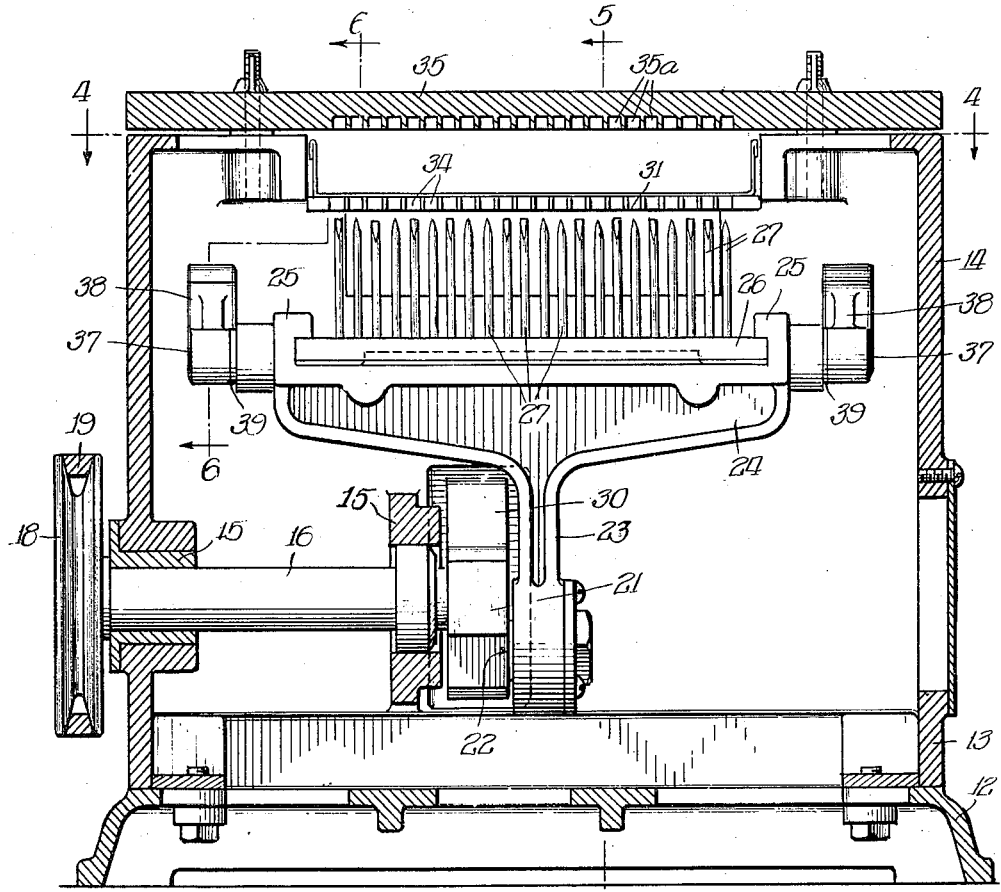
Fig. 3 is a detail vertical sectional view through the machine on the line 3—3 of Fig. 4.

The particular machine herein shown for the purpose of illustrating the invention comprises a machine base 12 to which there is connected a frame 13 extending upwardly and forming a housing 14. A pair of bearings 15, Fig. 3, is mounted in the frame 13 and rotatably carries a shaft 16 which is adapted for rotation by an electric motor 17, Figs. 1 and 2, mounted on the base 12. A sheave 18 on the shaft 16 is driven by a belt 19 from a smaller sheave 20 on the drive-shaft of the motor 17.

A crank-head 21, Figs. 3 and 5, is fixed to the inner end of the shaft 16, and this crank-head 21 is provided at one end with a pin or stud shaft 22, to which there is connected an arm 23. The arm 23 is projected upwardly, Fig. 3, and operatively carries a cross-head 24 which may be integral therewith, Fig. 3. At the ends of said cross-head are flanges 25, Fig. 3, beneath which are held the ends of a bar 26, containing a plurality of tools in the form of pins or needles 27, Figs. 10 to 12. These tools 27 are projected upwardly through the bar 26, and may be provided with chisel blades 28 at their upper ends, Fig. 10. The lower ends of the tools or needles 27 are provided with heads 29, which not only prevent their release but also hold them against rotary movement. A counter balance 30, Fig. 3, is on the crank-head 21 opposite to the location of the pin 22.

Figure 4:
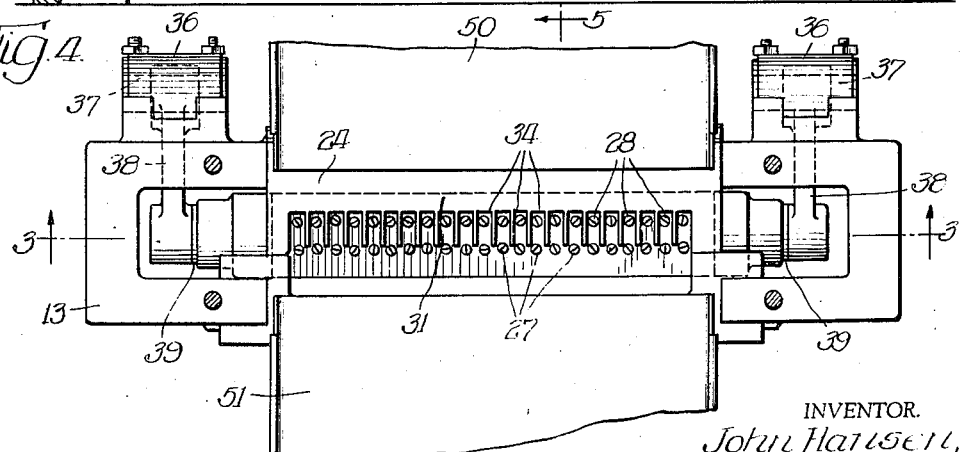
Fig. 4 is a detail plan section on the line 4—4 of Fig. 3.

As indicated in Figs. 3 to 5, the tools or needles 27 are arranged in pairs, those of one pair alternating with those of the next pair, but changes may be made in such arrangement so long as a sufficient number of tools are retained, and positioned in such a way as to do effective work.

Figure 1:
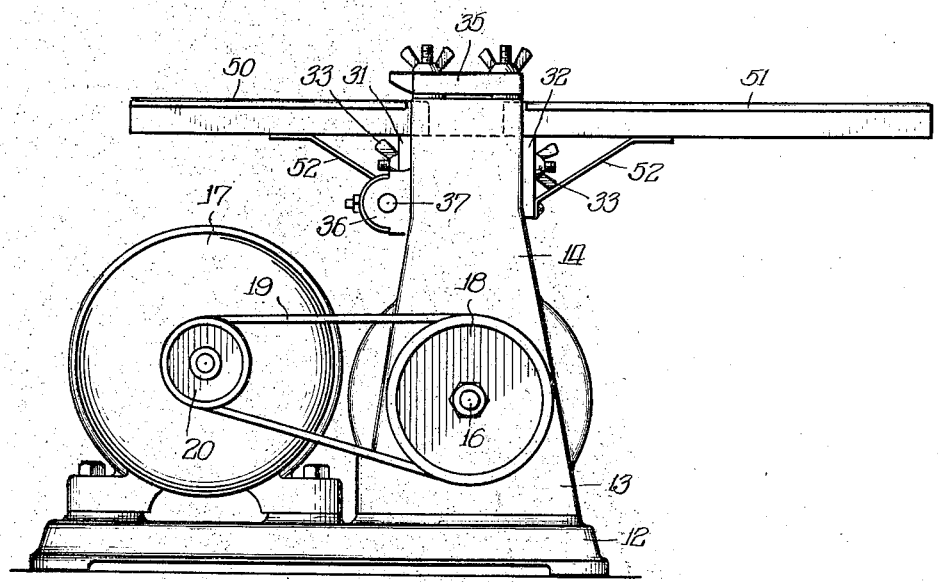
Fig. 1 is a side elevation of the improved tenderizing machine.

A pair of angle plates 31 and 32, Figs. 1 and 5, are attached to the sides of the housing 14 by means of bolts and nuts 33. The plate 31 may be provided with spaced slots or openings 34, Figs. 3 and 4, for the passage of the several pairs of needles 27, and also permitting a lateral movement of said needles. The upper faces of the plates 31 and 32 form a bed to support the material that is being operated on by the needles. Above said plates 31 and 32 and suitably spaced therefrom is a cap-plate 35, Figs. 3, 5, and 8, which is adapted to be secured to the top of the machine by bolts and nuts.

Up and down movement is imparted to the cross-head 24 when the shaft 16 is rotated, and a similar reciprocating movement is imparted to the bar 26 and tools carried thereby. This serves to move the cutting ends of the needles upwardly into proximity to the lower face of the cap-plate 35, which acts as a beater-block, against which the portions of meat between the cap-plate and plates 31 and 32 are operated upon. The cap-plate is preferably provided with apertures or recesses 35a to receive the tools or it may be formed of wood, or other relatively soft material, so that in case the ends of the tools or needles come in contact therewith they will not be injured.

The plates 31 and 32 not only form a bed-plate for the support and passage of a piece of meat to be acted upon, but they also act as stripper-plates to free the needles or tools and prevent portions of the meat from adhering to the needles. In the downward movement the tools or needles are moved to a point below said plates. By removal of the bolts 33 the plates 31 and 32 can be removed from opposite sides of the machine for the purpose of cleaning same.

The housing 14 may be provided with extensions or bearings 36 on one side thereof, and a pair of pivots 37 are journalled in these bearings. Arms 38 extend from the pivots 37 and are rockingly mounted by such connection. The inner ends of the arms 38 are pivotally connected to the ends of the cross-head 24, as indicated at 39, Figs. 4, 5, and 6. This arrangement serves to impart to said cross-head and to the tools 27 supported thereby an eccentric lateral movement. In this movement the blade of each of the tools enters the meat from the bottom through the openings in the plate 31 and then upwardly and over an arc, moving the meat as the tools are piercing it. The tools then move downwardly and disappear within the plate 31. In this movement the portions of meat are not only penetrated by the tools, and the tougher parts separated thereby, but in the lateral movement of the tools the pieces of meat are carried along thereby, and moved a distance along the plates 31 and 32 corresponding with such lateral movement. No special feed mechanism for the meat in its passage through the machine is therefore necessary. The amount of movement of the meat upon each movement of the tools is approximately one-half inch, in a machine of average size as herein shown. The size and proportions of the machine shown are substantially those of a machine used for the purpose.

Tools that are found to be effective for work of the kind mentioned are those having blades of the fish-tail type, as shown in Fig. 10, but other tools can be substituted therefor, such as punches shown in Fig. 11, or a concave serrated blade shown in Fig. 12. These tools are arranged in a bar and used interchangeably. Other types of said tools will be obvious to those skilled in the art. One advantage in the tools in which the blades are notched or serrated, as shown in Figs. 10 and 12, lies in the fact that when they are pushed against the sinews of a piece of meat the sinews will not slip from the ends of the tools, but will be carried along thereby until they are severed and broken.

Cap-plates 35 of varying thickness can be substituted for the one shown, so as to increase or diminish the space between said cap-plate and the bed-plate. The cap-plate can also be provided with perforations to receive the ends of the tools, as shown at 40 in Fig. 8, with the perforations elongated, or the lower face of the plate may be provided with the channels or apertures 35a, Figs. 3 and 5, to give freedom to the movement of the tool points or ends. A cap-plate made of wood, Fig. 9, can be used advantageously also.

A delivery or feed chute 50 may be fixed to the removable bed-plate 31 so that pieces of meat can be fed to the bed-plate of the machine, and a discharge chute or apron 51 may be fixed to the removable bed-plate 32 to receive the meat after it is acted upon by the tools. Straps or angle brackets 52, Figs. 1 and 5, may be fixed to the chutes 50 and 51 and connected by bolts to the frame so as to support the chutes and hold them in rigid position.

A removable shield 53, Fig. 6, may be placed over the top of the cap-plate 35, the shield being provided with downwardly projecting legs 54 which extend in between the side edges 55 of the chutes 50 and 51 so as to prevent debris or insects from getting into the interior of the casing or the meat channel.

In Fig. 7 there is shown a modified form of construction in which continuously operating conveyors are provided for feeding the meat to position and to discharge the meat from position after it is acted upon.

A delivery chute 60 and a discharge chute 61 are operatively connected to the machine, as previously described as regards the chutes 50 and 51. However, instead of having the bottom of the chute made of metal and integral with the sides thereof, the bottom of each chute may comprise endless conveyors 62. These endless conveyors are each supported on suitable rollers 63 and 64. The rollers 63 may have gears 65 fastened thereto which mesh with gears 66 suitably journalled on a part of the casing. The gears 66 are mounted on shafts 67 which also carry sheaves 68. Belts 69 drive the sheaves 68 from a double sheave 70 on the shaft 16. The arrangement is such that the meat will be continuously fed into the meat channel of the machine, acted upon by the tools, and then discharged away from the machine.

Two or more pieces of meat may be placed one on top of the other in layers and passed through the machine whereby portions of one layer will be forced into the other layer and knitted tightly together into a unitary piece. Layers of the same kind of meat can be knitted together or the layers may be of different kinds, so as to combine a piece of beef with a piece of pork, or the like. A strip of fat or other kind of meat can also be placed between two other layers probably of a tougher character and the three layers knitted together, the entire piece being tenderized in the process, and rendered palatable.

In Fig. 13 there is indicated a form of the machine in which there are two stripper-plates 80, spaced to form a meat channel 81, and with one tool gang 82 working from below, and another tool gang 83 operating from above. The lower gang works upwardly against the upper beater board, and the upper gang works downwardly against the lower beater board and bedplate. The two gangs work in unison, so as to enter and leave the meat at the same time, and jointly feed the meat along the channel. This can be accomplished by a double worm-gear drive, indicated at 84, and driving similar gears 85 on the shafts 86 for operating said gangs 82 and 83.

The invention provides a machine which is capable of positively and definitely tenderizing meat, and meat so tenderized by the present machine will retain a property which is lost by tenderizers of the conventional type. When the meat is pierced by the sharp blades, the sinews of the meat are cut so that they do not remain stringy and tough. Channels are cut in the meat during the tenderizing operation, but these channels are quickly closed when the meat is cooked so that the juice in the meat will be retained. Conventional tenderizers which cut the meat into strips, or tear the meat, do not retain the juice as well.

A piece of meat can be fed through the machine so often that the meat almost appears to be in the form of hamburger, although it does not fall apart as readily as ground hamburger. There are, therefore, different stages of processing the meat through the machine, each stage having its advantage. Because the piercing blades have a definite cutting action, and not a pressing action like the old mallet method of tenderizing meat, the juices are retained in the meat which is tenderized by passing the same through the tenderizing machine.

The invention provides a machine for tenderizing the tougher kinds and cuts of meat to make the meat tender and palatable. Moreover, the machine not only tenderizes the meat by breaking down the tough fibres, but because of the action and movement of the tools, causes the meat to be fed to position to be tenderized and then moved to discharge position. The action or movement of the tools is in the form of an orbit whereby there is not only reciprocating movement but arcuate and lateral movement as well. This movement is given to the cross-head by the crank and the pivot arms 38. Furthermore, the invention is capable of various modifications whereby the tools may operate in a plurality of gangs from opposite sides or from the same side, the tools being interchangeable in gangs or sets and easily replaceable. The invention also provides a machine which is strong and durable in construction, which can be readily and economically manufactured and which is positive and efficient in operation.

Changes may be made in the form, construction and arrangement of the parts, and the method may be varied within certain limits without departing from the spirit of the invention, and the right is hereby reserved to make all such changes as fairly fall within the scope of the following claims.

The invention is hereby claimed as follows:

1. A substance tenderizing machine comprising a stationary plate member forming a substance support, said plate member being provided with a plurality of openings arranged transversely of the substance support, a plurality of tenderizing tools arranged transversely of the substance support and adapted to pass through said openings in the substance support to pierce said substance, means for imparting a reciprocating movement to said tools whereby the tools will penetrate the substance to break down the fibres thereof to tenderize the same, and means to impart a lateral movement to said tools to feed the substance through the machine and along said stationary supporting plate member.

2. A substance tenderizing machine comprising a stationary plate member forming a substance support, said plate member being provided with a plurality of openings arranged transversely of the substance support, a plurality of tenderizing tools arranged transversely of the substance support and adapted to pass through said openings in the substance support to pierce said substance, means to reciprocate said tools upwardly and downwardly through said openings and through the substance to tenderize the same, and means to shift the position of said tools after they have pierced said substance to impart feeding movement of said substance to move bodily the pierced portion of the substance along said stationary supporting plate member and out of the path of the tools upon their next piercing operation.

3. A substance tenderizing device comprising a stationary plate member forming means to support substance to be acted upon, said plate member being provided with a plurality of openings arranged transversely of the substance support, a plurality of tenderizing tools arranged transversely of the substance support and adapted to pass through said openings in the substance support to pierce said substance to break down any tough or fibrous matter contained in the substance, means to operate said tools upwardly and downwardly to pierce the substance, and means to shift said tools laterally after a piercing operation to impart a feeding movement to said substance along said stationary supporting plate member.

4. A meat tendering machine comprising a stationary plate member forming means to support a piece of meat, said plate member being provided with a plurality of openings arranged transversely of the substance support, vertically reciprocal means arranged transversely of the substance support and adapted to pass through said openings in the substance support to penetrate said meat and break the tougher fibres or parts thereof, and means for imparting additional movement to said penetrating means to feed said meat along said support.

5. In a meat tendering machine, the combination of an enclosure forming a stationary channel guide for the support and guidance of a quantity of meat, said channel guide being provided with a plurality of openings arranged transversely of the channel, means for feeding a quantity of meat into and out of said channel and comprising meat tendering devices arranged transversely of said channel and operable in the openings of said channel, and means for actuating said devices to cause the same to operate simultaneously on said meat to penetrate the meat to tenderize the same and cause a feed movement of the meat in said channel while the devices are piercing the meat.

6. In a meat tendering machine having a stationary meat supporting channel provided with a plurality of openings arranged transversely thereacross, a unitary member arranged transversely of said channel and including a plurality of meat tendering devices arranged in alignment with said openings, means for causing a predetermined reciprocal movement of said tendering devices through said openings into and out of said channel, each of said tendering devices being of substantially the same length to penetrate substantially equal distances into substance in said channel, and means for giving to said tendering devices an additional movement coincidently with said first named movement to feed a piece of meat in said channel along its course.

7. A meat tenderizing machine comprising a frame, a cross-head mounted in said frame for reciprocation, means for reciprocating said cross-head, a meat tendering unit carried by said cross-head, including meat tenderizing tools, a bed-plate mounted in said frame forming a meat support, said bed-plate being provided with openings for the operation of meat tendering tools, and connections between said frame and the cross-head causing said tools when reciprocated to leave a piece of meat at different points relative to the bed-plate, from where they enter the same, with a feed movement of the meat between the two points.

8. A meat tendering machine comprising a frame, a member mounted in said frame for reciprocation, a crank member connected with the lower end of said member to reciprocate the same, rock-arms connecting the upper end of said member with said frame, a cross-head connected with said first named member, a plurality of meat tendering devices carried by said cross-head, a bed-plate supported in said frame and provided with openings for the operation of said devices, and means for effecting operation of said crank member, the action of said rock-arms serving to carry the tendering devices upwardly and downwardly in an arcuate manner providing for feeding meat through the machine.

9. A meat tenderizing machine comprising a lower supporting plate, an upper cap-plate spaced from the lower plate and providing a space wherein meat to be tenderized may be received, tenderizing tools passing through one of the plates to penetrate the meat and tenderize the same against the other plate, means to reciprocate said tools to cause such penetration, and additional means to impart a lateral movement to said meat after penetration.

10. A meat tendering machine comprising a frame, a cross-head mounted in said frame for reciprocation, a bar held removably in said cross-head, a plurality of tools secured in said bar and provided at their ends with blades to pierce a piece of meat, a bed-plate mounted in said frame and provided with openings for the operation of said tools, a beater block opposed to the action of said tools, means for giving a reciprocating movement to said cross-head and means for feeding the meat when the tools are in piercing engagement therewith.

11. A meat tendering machine comprising a frame, a cross-head mounted in said frame for reciprocation, a bar held removably in said cross-head, a plurality of removable meat tendering tools on said bar, a bed-plate mounted in said frame and provided with openings for the operation of said tools, a second plate spaced from said bed-plate to form a meat passage and opposed to the action of said tools in operating upon a piece of meat, means for reciprocating said cross-head, and means for giving to said cross-head a lateral movement to assist in feeding a piece of meat along said passage.

12. A meat tendering machine comprising a frame, a member mounted in said frame for reciprocation, a crank device operatively connected with one end of said member to reciprocate the same and give a rocking movement to the other end of said member, a cross-head connected with the other end of said member, a plurality of meat tendering tools carried by said cross-head, a stripper-plate provided with openings for the operation of said tools and forming a meat supporting plate, and connections with said cross-head to give a secondary rocking movement thereto for giving a piece of meat a step-by-step movement through the machine.

13. A meat tendering machine comprising a frame, a cross-head mounted in said frame for reciprocation and provided with an actuating arm, a crank member mounted in said frame and operatively connected with said arm, a meat tendering unit carried by said cross-head, including meat macerating and tenderizing tools, a bed-plate mounted in said machine and provided with openings for the movement of said tools therein, and connections between said frame and cross-head controlling the action of the cross-head to cause an eccentric feed movement thereof coincidently with the reciprocation thereof.

14. A meat tendering machine comprising a frame, a stripper-plate secured in said frame, said stripper-plate being provided with suitable openings for the passage of tendering devices and forming the bed-plate of a meat passage-way, a second plate providing a cooperative part of said passage-way, a cross-head mounted adjacent said stripper-plate, a plurality of meat tendering devices carried by said cross-head, means for causing said tendering devices to enter said passage-way and recede therefrom, and means to impart a rocking movement to said cross-head, said second plate forming a beater block to the action of such devices.

15. A meat tendering machine comprising a frame, a stripper-plate formed of two parts, each removably attached to the frame, at least one of said parts being provided with openings for the passage of meat tendering devices and forming a support for a quantity of meat passing through the machine, a cross-head mounted for reciprocation beneath said stripper-plate, means for reciprocating said cross-head, a plurality of meat tendering tools carried by said cross-head and operable through said stripper-plate, a cap-plate spaced above said stripper-plate and forming a barrier for the tendering tools to operate against, and means for giving to said tools a feed movement longitudinally of the stripper-plate.

16. A meat tendering machine comprising a frame, a cross-head mounted in said frame for reciprocation, means to reciprocate said cross-head, a plurality of meat tendering devices carried by said cross-head, a stripper-plate for said devices, and means for controlling the movement of said cross-head to give a lateral feed movement thereto, said reciprocating means including means for tipping said tendering devices away from the center line of the machine upon leaving a piece of meat.

17. In the art of tendering meat, those steps which comprise supporting a piece of meat to be made tender between opposed surfaces, rapidly inserting meat tenderizing tools into the meat and rapidly withdrawing them to tenderize the meat while avoiding severance of the meat into pieces, and shifting the tools laterally before they are withdrawn from the substance to impart a lateral feed movement to the meat.

18. A meat tenderizing machine comprising a supporting plate, a cap plate spaced from the supporting plate and providing a space wherein meat to be tenderized may be received, tenderizing tools passing through one of the plates to penetrate the meat and tenderize the same against the other plate, means to reciprocate said tools to cause such penetration, and additional means to impart a progressive movement to said meat by said tools after penetration.

19. A meat tendering machine comprising a frame, a bed-plate in said frame provided with openings for the passage of meat tendering tools, a meat tendering member supported adjacent said bed-plate and provided with a plurality of meat tendering tools operable through said bed-plate to pierce a piece of meat, means for actuating said member to cause a movement of said tools through the bed-plate, a cap-plate cooperating with said bed-plate and spaced therefrom, and means for effecting feeding of the meat by said tools when in piercing engagement with the meat.

20. A meat tenderizing machine of the character described comprising a plurality of tenderizing tools arranged transversely of the feed of substance through the machine adapted to penetrate and tenderize the meat while avoiding severance of the substance into pieces, each of said tendering devices being of substantially the same length to penetrate substantially equal distances into the substance, and means for operating said tools to effect successive penetrations and withdrawal of the tools into and out of the meat and to effect progressive movement of the meat by the tools during penetration.

21. A meat tenderizing machine comprising a pair of opposed spaced supporting plates providing a space within which meat to be tenderized may be received, a set of tenderizing tools mounted adjacent each of said plates and passable through the respective plates to penetrate the meat from opposite sides and tenderize the same against the opposite plate, and means for operating said tools to effect successive penetrations and withdrawal of the tools into and out of the meat and to move the tools laterally to effect progressive feeding movement of the meat by the tools during penetration.

22. A meat tenderizing machine comprising a pair of opposed spaced supporting plates providing a space within which meat to be tenderized may be received, tenderizing tools passable through at least one of said plates to penetrate the meat and tenderize the same against the opposite plate, and means for operating said tools to effect successive penetrations and withdrawal of the tools into and out of the meat and to move the tools laterally to effect progressive feeding movement of the meat by the tools during penetration.

23. A substance tenderizing device comprising a stationary plate member forming means to support substance to be acted upon, said plate member being provided with a plurality of openings arranged transversely of the substance support, a plurality of tenderizing tools arranged transversely of the substance support and adapted to pass through said openings in the substance support to pierce said substance to break down any tough or fibrous matter contained in the substance, and means to move the ends of said tools up and down and laterally in orbits.

24. A meat tendering machine comprising a frame, a cross-head mounted in said frame and arranged transversely of the feed of substance through the machine, means for reciprocating said cross-head, a plurality of meat tendering devices carried by said cross-head transversely of the machine and adapted to pierce a piece of substance to tenderize the substance while avoiding severance of the substance into pieces, each of said tenderizing devices being of substantially the same length to penetrate substantially equal distances into the substance, and means for controlling the movement of said cross-head to give a lateral feed movement to the substance to feed the substance through the machine, said lateral movement being coincident with the reciprocating movement of the cross-head.

JOHN HANSEN.